(12) United States Patent
Nayler

(10) Patent No.: US 7,120,208 B1
(45) Date of Patent: *Oct. 10, 2006

(54) DEVICE AND METHOD FOR ADJUSTING INPUT GAIN FOR MULTIPLE SIGNAL FORMATS IN A DATA NETWORK

(75) Inventor: Colin D. Nayler, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/533,342

(22) Filed: Mar. 23, 2000

(51) Int. Cl.
*H04L 27/08* (2006.01)

(52) U.S. Cl. .................................................. 375/345

(58) Field of Classification Search ................ 375/345, 375/340, 344; 455/232.1, 234.1, 245.1; 330/147, 330/148
See application file for complete search history.

(56) References Cited

U.S. PATENT DOCUMENTS

| | | | | |
|---|---|---|---|---|
| 4,607,390 A | * | 8/1986 | Faugeron | 455/143 |
| 5,907,585 A | * | 5/1999 | Suzuki et al. | 375/324 |
| 6,049,361 A | * | 4/2000 | Kim | 348/678 |
| 6,311,047 B1 | * | 10/2001 | Gotou | 455/234.1 |
| 6,320,913 B1 | * | 11/2001 | Nakayama | 375/297 |
| 6,424,221 B1 | * | 7/2002 | Korn | 330/282 |
| 6,724,829 B1 | * | 4/2004 | Tzukerman et al. | 375/295 |

FOREIGN PATENT DOCUMENTS

| | | |
|---|---|---|
| EP | 0562422 | 9/1993 |
| EP | 0774850 | 5/1997 |
| EP | 0881806 | 12/1998 |

OTHER PUBLICATIONS

International Search Report Re: PCT/US00/27616 dated Feb. 2, 2001.

* cited by examiner

*Primary Examiner*—Pankaj Kumar
(74) *Attorney, Agent, or Firm*—Renner, Otto, Boisselle & Sklar, LLP

(57) ABSTRACT

A network receiver is configured for receiving a modulated carrier signal from another network transceiver via a network medium, the modulated carrier signal may be either a pulse position modulated (PPM) carrier or a quadrature amplitude modulated (QAM) carrier. The network receiver is configured to select an optimal gain setting for the input amplifier corresponding to whether the modulated carrier is PPM or QAM.

22 Claims, 4 Drawing Sheets

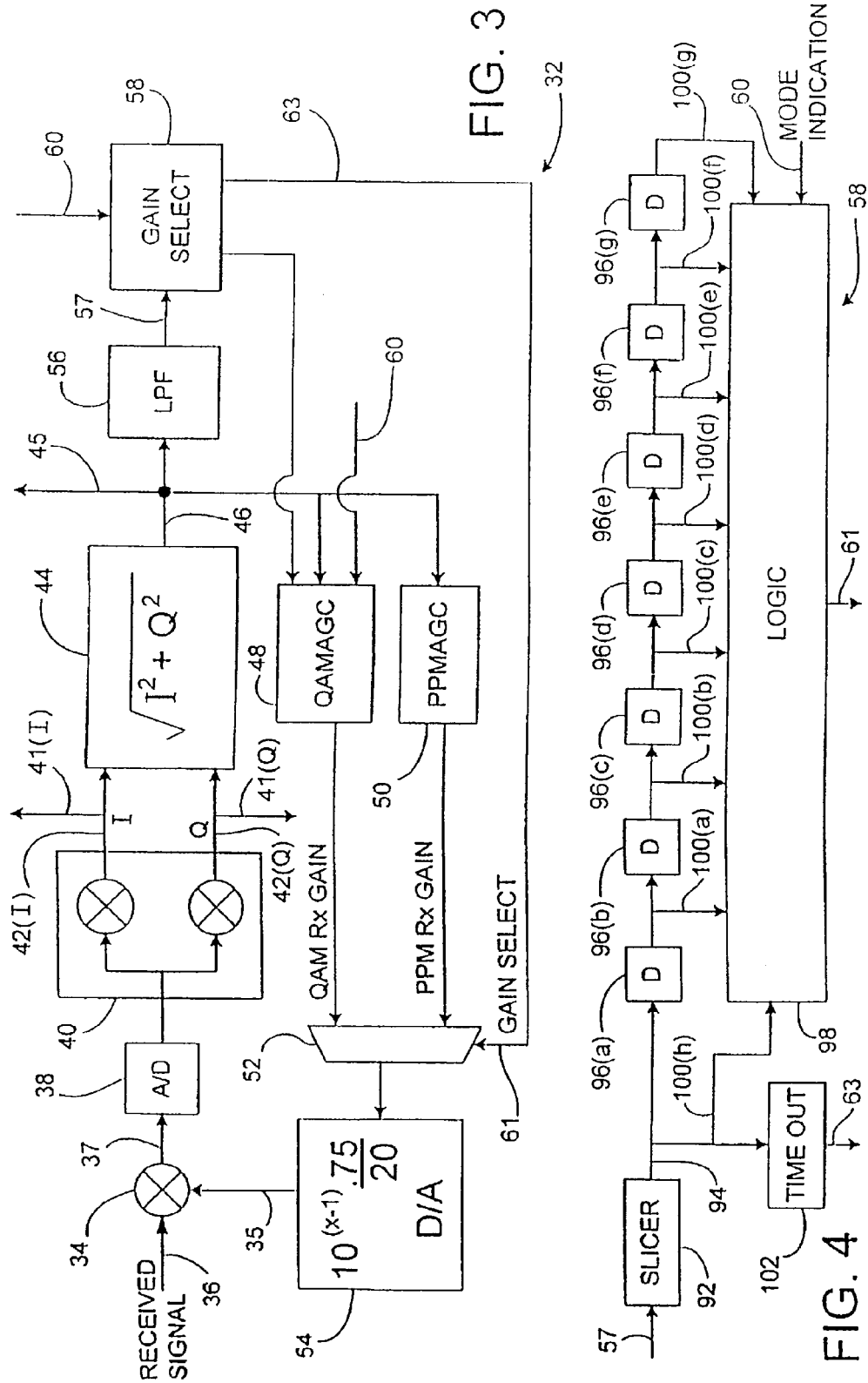

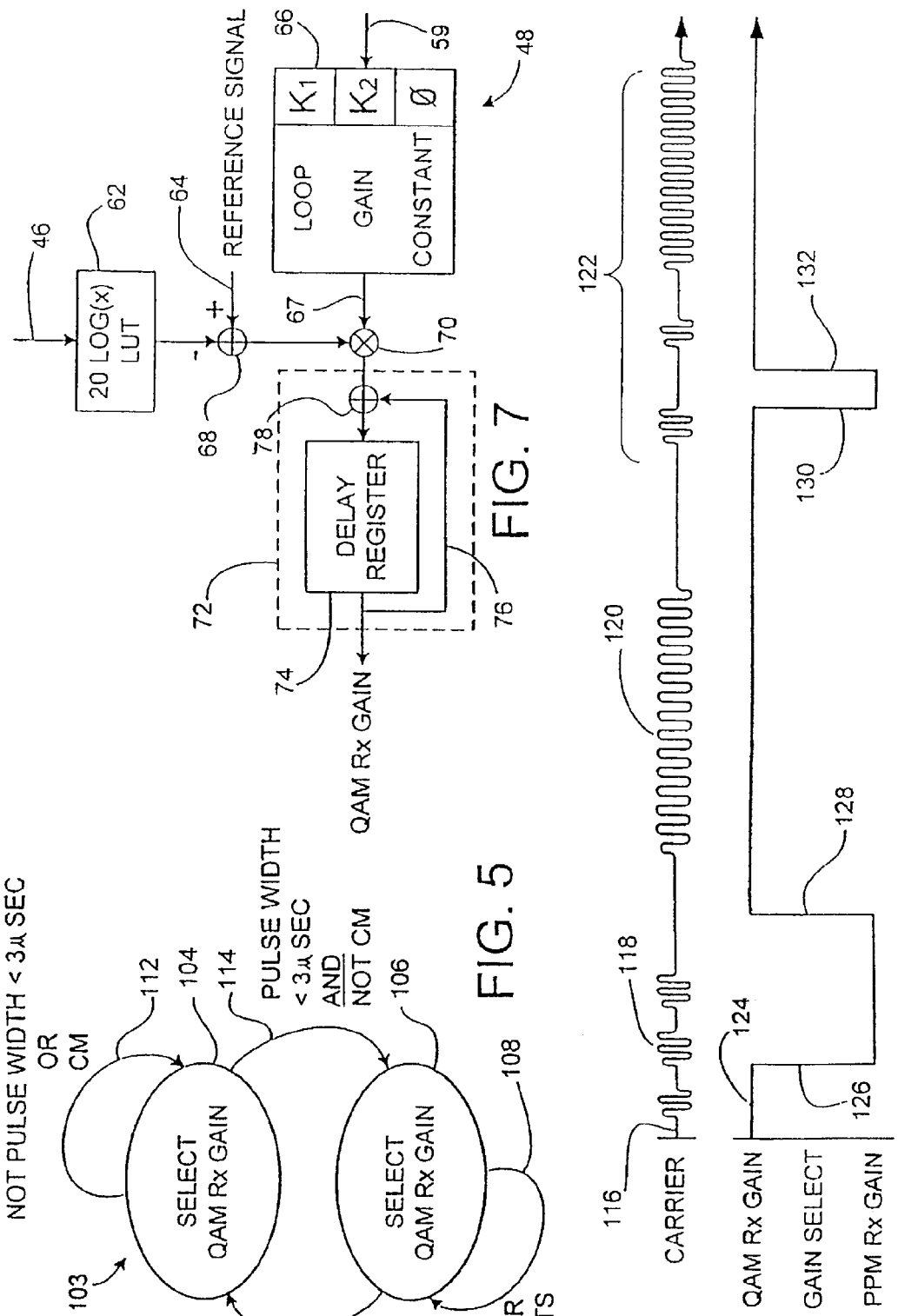

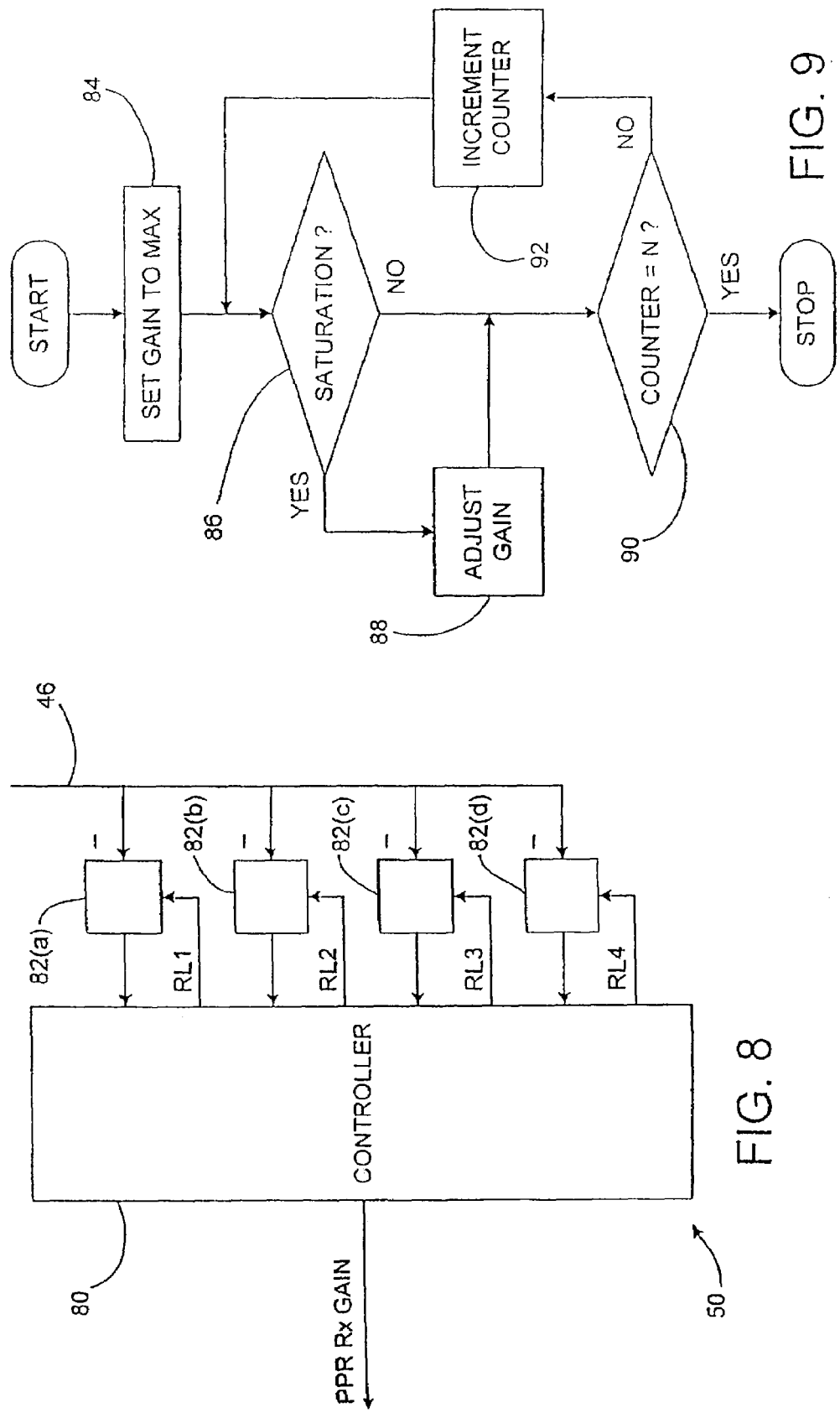

DEVICE AND METHOD FOR ADJUSTING INPUT GAIN FOR MULTIPLE SIGNAL FORMATS IN A DATA NETWORK

TECHNICAL FIELD

The present invention relates generally to network interfacing, and more particularly, to a system for controlling transmission of data between network stations connected to a network medium and a device and method for adjusting input gain for multiple signal formats in a data network.

BACKGROUND OF THE INVENTION

The transmission of various types of digital data between computers continues to grow in importance. The predominant method of transmitting such digital data includes coding the digital data into a low frequency base data signal and modulating the base data signal onto a high frequency carrier signal. The high frequency carrier signal is then transmitted across a network cable medium, via RF signal, modulated illumination, or other network medium, to a remote computing station.

At the remote computing station, the high frequency carrier signal must be received and demodulated to recover the original base data signal. In the absence of any distortion of the carrier signal across the network medium, the received carrier would be identical in phase, amplitude, and frequency to the transmitted carrier and could be demodulated using known mixing techniques to recover the base data signal. The base data signal could then be recovered into digital data using known sampling algorithms.

However, the network topology tends to distort the high frequency carrier signal due to numerous branch connections and different lengths of such branches causing numerous reflections of the transmitted carrier. The high frequency carrier is further distorted by spurious noise caused by electrical devices operating in close proximity to the cable medium. Such problems are even more apparent in a network which uses home telephone wiring cables as the network cable medium because the numerous branches and connections are typically designed for transmission of plain old telephone system POTS signals in the 0.3–3.4 kilohertz frequency and are not designed for transmission of high frequency carrier signals on the order of 7 Megahertz. Further yet, the high frequency carrier signal is further distorted by turn-on transients due to on-hook and off-hook noise pulses of the POTS utilizing the network cables.

Such distortion of frequency, amplitude, and phase of the high frequency carrier signal degrades network performance and tends to impede the design of higher data rate networks and challenges designers to continually improve modulation techniques and data recovery techniques to improve data rates. For example, under the HPNA 1.0 standard, a 1 Mbit data rate is achieved using pulse position modulation (PPM) of a carrier, while the more recent 2.0 standard achieves a 10 Mbit data rate using a complex modulation scheme utilizing a frequency diverse quadrature amplitude modulation (QAM).

A problem associated with advancing standards and increasing data rates is that, as in the HPNA example, the modulation techniques are not the same. As such, backwards compatibility is not inherent in the design of the newer systems. For example, in the HPNA system, to be backwards compatible, the newer 2.0 receiver must be able to demodulate both the PPM modulated carrier compliant with the 1.0 standard and the frequency diverse QAM modulated carrier compliant with the 2.0 standard. As such, many of the functions in the receiver must be implemented in two distinct circuits, one circuit for the PPM and one circuit for the QAM, thereby increasing the cost and complexity of the receiver.

For example, receivers typically include an A/D converter for sampling the modulated carrier signal and generating a series of samples occurring at a sample frequency. The series of samples are input to the remainder of the receiver circuitry that is typically implemented on a digital signal processor (DSP).

An amplifier conditions the signal, in accordance with a gain setting of the amplifier, prior to the A/D converter to assure that the signal parameters are within the dynamic range of the A/D converter. The gain of the amplifier is typically set using a closed loop feedback system. A problem exists in that a PPM modulated carrier signal and a QAM modulated carrier signal have significantly different power envelopes. More specifically, the power on the PPM modulated carrier occurs in short pulses on the order of 3 usec and the power on a QAM modulated carrier is continuous for the entire transmission frame. Feedback circuitry useful for setting input gain in a pulsed power environment is fundamentally different than feedback circuitry useful in setting input gain in a continuous power environment. As such, complicated feedback circuitry would be required to accommodate rapid gain adjustment for both PPM and QAM signals. Such circuitry would significantly add to the size and cost of a receiver.

Therefore, based on recognized industry goals for size and cost reductions, what is needed is a device and method for adjusting input gain for an amplifier in a receiver capable of receiving modulated carrier signals modulated using multiple modulation techniques.

SUMMARY OF THE INVENTION

A first aspect of the present invention is to provide a network receiver configured for receiving a modulated carrier signal from another network transceiver via a network medium. The network receiver includes: a) an input amplifier for amplifying a received modulated carrier signal according to one of a plurality of amplifier gain settings and outputting an amplified carrier signal; b) an envelope detector configured for outputting an envelope signal in response to the amplified carrier signal; c) a first gain control circuit configured to select a first gain setting in response to the envelope signal, the first gain setting being optimal for receiving a pulse position modulated carrier signal; d) a second gain control circuit configured to select a second gain control setting in response to the envelope signal, the second gain setting being optimal for receiving a quadrature amplitude modulated signal; and e) selection circuitry configured to determine whether the envelope signal represents a pulse position modulated carrier or an amplitude modulated carrier and sets the amplifier gain setting to the first gain setting or a second gain setting respectively.

The network receiver may further include an analog to digital converter generating a digital carrier signal in response to the amplified carrier signal and a Hilbert transformer generating a digital I channel carrier signal and a digital Q channel carrier signal in response to the amplified carrier signal, the envelope detector responsive to the I channel carrier signal and the Q channel carrier signal.

The selection circuitry may include a carrier sense circuit for detecting the duration of a power pulse in the envelope signal, may select the first gain setting if the duration of a power pulse is less than a duration on the order of a duration of a pulse position modulation power pulse, and may select the second gain setting if the duration of a power pulse is greater than a duration on the order of a duration of a pulse position modulation power pulse.

The envelope signal may represent the square root of the sum of the square of the I channel carrier signal and the square of the Q channel carrier signal.

The first gain control circuit may include a plurality of comparators, each configured to compare the envelope signal with one of a plurality of reference signals and the first gain setting is determined by detecting saturation of at least one comparator when iteratively testing each of the plurality of gain settings. The second gain control circuit may include a logarithmic look up table generating a log signal representing the envelope signal, a comparator comparing the log signal to a reference signal to generate a difference signal, a multiplier multiplying the difference signal by a loop gain constant to generate a product, and an integrator integrating the product to generate the second gain setting. The loop gain constant may be selected to be a large value for a first portion of a detected power pulse, a smaller value for a second portion of a detected power pulse, and zero for a remaining duration of a detected power pulse.

A second aspect of the present invention is to provide a method of determining a gain setting for an input amplifier generating an amplified carrier signal in a receiver configured for receiving a modulated carrier signal from a network medium. The method may include: a) generating an envelope signal from the amplified carrier signal representing the amplified carrier signal power; b) determining a first gain setting in response to the envelope signal, the first gain setting selected for receiving a pulse position modulated carrier signal; c) determining a second gain setting in response to the envelope signal, the second gain setting selected for receiving a quadrature amplitude modulated carrier signal; d) determining whether the modulated carrier signal is a pulse position modulated carrier or a quadrature amplitude modulated carrier; and e) setting the gain of the input amplifier to the first gain setting if the modulated carrier signal is determined to be a pulse position modulated carrier and setting the input amplifier gain to the second gain setting of the modulated carrier signal is determined to be a quadrature amplitude modulated carrier.

The method may further include converting the amplified carrier signal to a digital carrier signal and generating an I channel signal and a Q channel signal from the digital carrier signal, the envelope signal being generated from the I channel signal and the Q channel signal.

The step of setting the gain of the input amplifier may include detecting the duration of a power pulse in the envelope signal, setting the gain of the input amplifier to the first gain setting if the duration of a power pulse is less than a duration on the order of a duration of a pulse position modulation power pulse, and setting the input amplifier gain to the second gain setting if the duration of a power pulse is greater than a duration on the order of a duration of a pulse position modulation power pulse.

The envelope signal may represent the square root of the sum of the square of the I channel signal and the square of the Q channel signal.

The first gain setting may be determined by comparing the envelope signal to a plurality of reference levels and iteratively testing each of the plurality of gain settings for saturation occurring at least one reference level to determine the first gain setting. The second gain setting may be determined by converting the envelope signal to a log signal representing the envelope signal, comparing the log signal to a reference level to determine a difference, multiplying the difference by a loop gain constant to determine a product, and integrating the product to determined the second gain setting. The loop gain constant may be selected to be a large value for a first portion of a detected power pulse, a smaller value for a second portion of a detected power pulse, and zero for a remaining duration of a detected power pulse.

BRIEF DESCRIPTION OF THE DRAWINGS

FIG. 3 is a block diagram of a gain control feedback loop in accordance with one embodiment of this invention;

FIG. 4 is a block diagram of a gain select circuit in accordance with one embodiment of this invention;

FIG. 5 is a state machine diagram showing operation of the gain select circuit of FIG. 4;

FIG. 6 is a diagram showing exemplary operation of the state machine of FIG. 5;

FIG. 7 is a block diagram of a gain control circuit useful in determining amplifier gain setting for a quadrature amplitude modulated carrier in accordance with one embodiment of this invention;

FIG. 8 is a block diagram of a gain control circuitry useful in determining amplifier gain setting for a pulse position modulated carrier in accordance with one embodiment of this invention; and FIG. 9 is a flow chart showing operation of a microcontroller useful in the circuit of FIG. 8.

DESCRIPTION OF THE PREFERRED EMBODIMENTS

Figure 1:
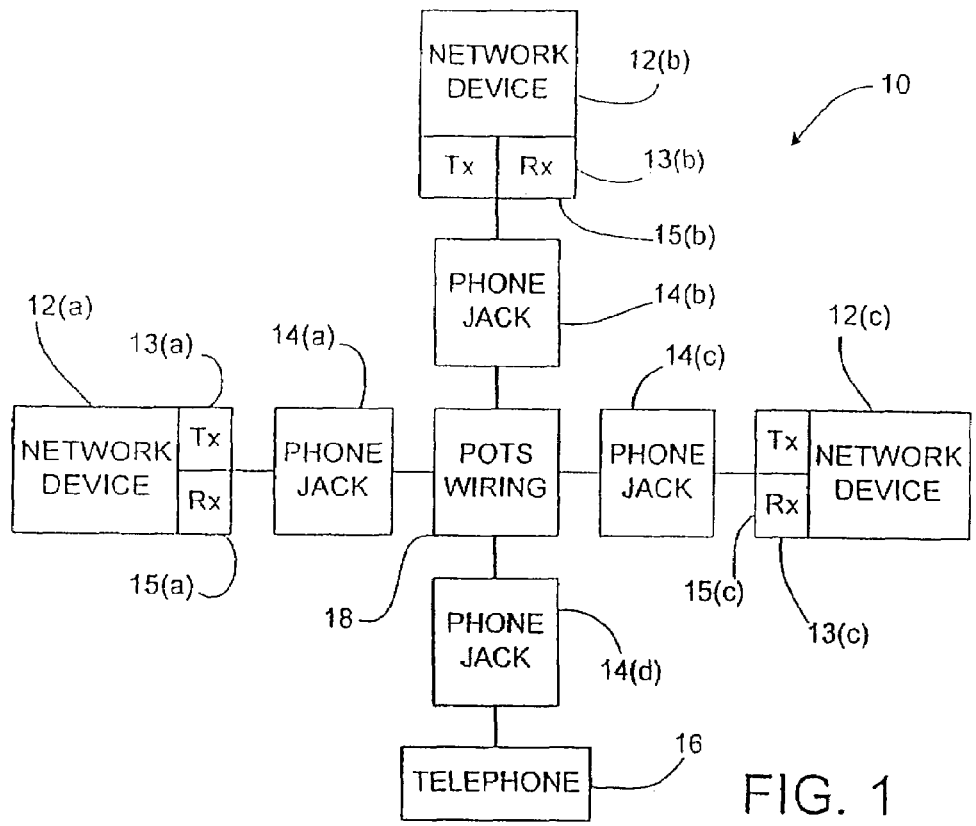
FIG. 1 is a block diagram of a local area network in accordance with one embodiment of this invention.

The present invention will now be described in detail with reference to the drawings. In the drawings, like reference numerals are used to refer to like elements throughout.

FIG. 1 is a diagram of a local area network 10 implemented in a home environment using twisted pair network media according to an embodiment of this invention. As shown in FIG. 1, the network 10 includes network stations 12(a)–12(c) that are connected to a telephone line (twisted pair) wiring 18 via RJ-11 phone jacks 14(a)–14(c) respectively. A telephone 16 is connected to an RJ-11 phone jack 14(d) and may continue to make telephone calls while network devices 12(a)–12(c) are communicating network data.

As shown in FIG. 1, each network device 12 may be a personal computer, printer, server, or other intelligent consumer device and each includes a transceiver 13(a)–13(c) respectively for communicating with other network devices 12(a)–12(c) via the network media 18.

Each of network devices 12(a)–12(c) communicates by transmitting an analog network signal comprising a carrier signal modulated with network data. A portion of network devices 12(a)–12(c) may utilize pulse position modulation (PPM) wherein network data is modulated on the carrier utilizing discrete band limited pulses. Another portion of network devices 12(a)–12(c) may selectively utilize PPM modulation or quadrature amplitude modulation (QAM) wherein network data is modulated on the carrier by varying both the amplitude and phase of the carrier in accordance with a complex encoding constellation. In the preferred embodiment, the PPM modulation adheres to the Home Phoneline Network Alliance (HPNA) 1.0 standard, as promulgated by a consortium of network equipment providers including Advance Micro Devices, Inc. of Sunnyvale, Calif., and provides for a 1 Mbit data rate and the QAM modulation adheres to the HPNA 2.0 standard and provides for a 10 Mbit data rate. As such, it should be appreciated that data communication between a networked device 12 which is only capable of PPM modulation and any other device will utilize a PPM modulated carrier. However, data communication between two devices that are capable of both PPM and QAM modulation will utilize the faster data rate of a QAM modulated carrier. Therefore, at the receiving network device, it should be appreciated that a transceiver 13(*a*)–13(*c*) capable of both PPM and QAM must be able to receive data utilizing both a PPM and a QAM modulated carrier which includes detecting the presence of each such carrier, distinguishing between each such carrier, and receiving and demodulating each such carrier.

Further yet, to facilitate communication between devices 12(*a*)–12(*c*) in network 10 which includes both HPNA 1.0 devices and HPNA 2.0 devices, a third mode of operation called compatibility mode exists. A compatibility mode frame utilizes a PPM modulated header immediately followed by QAM modulated data. A transceiver 13(*a*)–13(*c*) must further be able to distinguish between a PPM frame and a compatibility mode frame and appropriately receive each.

Figure 2A:
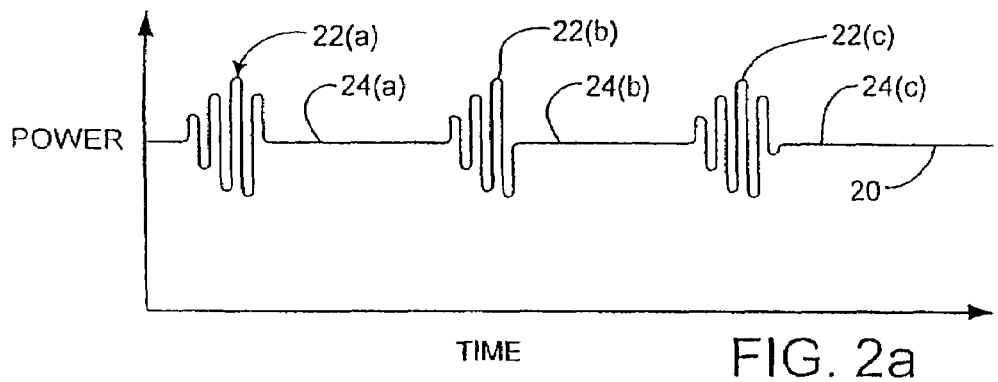
FIG. 2a is a diagram of a pulse position modulated carrier in accordance with one embodiment of this invention.
Figure 2B:
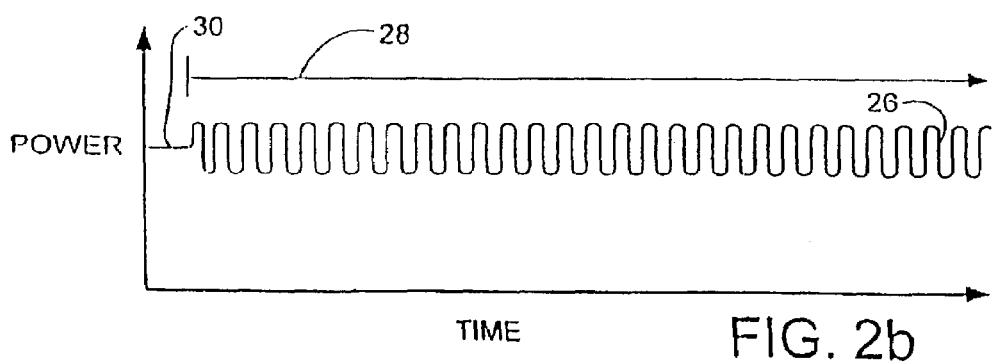
FIG. 2b is a diagram of a quadrature amplitude modulated carrier in accordance with one embodiment of this invention.

As discussed above, the power envelopes of a carrier modulated utilizing PPM and a carrier modulated using QAM are fundamentally different. Referring to FIG. 2*a*, the power envelope of a PPM modulated carrier 20 includes a plurality of distinct power pulses 22(*a*)–22(*c*) separated by power dwells 24(*a*)–24(*c*) within each frame. Referring to FIG. 2*b*, the power envelope of a QAM modulated carrier 26 includes a continuous power carrier during the duration of a frame 28 with a power dwell 30 occurring between frames.

Also, as discussed previously, the wiring topology of the network media (FIG. 1) may cause significant distortion such that the strength of a signal may vary significantly and multiple localized maxima and minima may occur in a received carrier signal. Each receiver 15(*a*)–15(*c*) in each transceiver 13(*a*)–13(*c*) must accommodate for such distortion when receiving network data in addition to detecting the presence of a carrier and distinguishing between a QAM modulated carrier and a PPM modulated carrier. In a receiver 15(*a*)–15(*c*) implemented in a digital environment wherein a received analog modulated carrier is sampled with an A/D converter to generate a digital representation of such carrier, accommodating for such distortion includes utilizing an input amplifier to amplify the carrier signal to appropriately utilize the dynamic range of the A/D converter.

Referring to FIG. 3, a circuit 32 useful for setting the gain of an input amplifier 34 to utilize the full dynamic range of A/D converter 38 is shown. In operation, input amplifier 34 amplifies received signal 36 based on a gain setting 35. The amplified signal 37 is then input to the A/D converter 38. The A/D converter 38 functions to sample the amplified signal 37 and generate a series of digital sample values representing the modulated carrier. The digital sample values are then input to a Hilbert transformer 40 which functions using known techniques to separate an I channel signal 42(I) and a Q channel signal 42(Q) from the digital sample values. The I channel signal 42(I) and the Q channel signal 42(Q) are input to an envelope detector 44 which utilizes known techniques to calculate the square root of the sum of $I^2+Q^2$ and generate an envelope signal 46 representative thereof.

The I channel signal 42(I) and the Q channel signal 42(Q) are also coupled to a receiver (not shown) for recovering QAM modulated data on line 41(I) and 41(Q) while the envelope signal 46 is coupled to the receiver (not shown) for recovering PPM modulated data.

The envelope signal 46 is also coupled to each of a QAM automatic gain control (QAM AGC) circuit 48 and a PPM automatic gain control (PPM AGC) circuit 50. The QAM AGC circuit 48 functions to generate a QAM gain value (QAM RxGain) while the PPM AGC circuit 50 functions to generate a PPM gain value (PPM RxGain). A multiplexer 52 operates to select which of the QAM RxGain and the PPM RxGain will be used to amplify received signal 36 in accordance with a gain select signal on line 61. The selected gain signal, either QAM RxGain or PPM RxGain, from multiplexer 52 is input to a logarithmic D/A converter 54 which generates analog gain signal 35 which sets the gain of input amplifier 34.

The envelope signal 46 is also input to a low pass filter 56 generating a filtered envelop signal which, in turn, is coupled to a gain select circuit 58 for selecting QAM RxGain or PPM Rx Gain in accordance with detection of a PPM frame, QAM frame, and compatibility mode frame.

Referring to FIG. 4, the gain select circuit 58 will typically include a slicer 92 or other threshold detector for receiving the filtered envelope signal on line 57. The slicer 92 compares the filtered envelope signal to a threshold value and generates a slicer output signal on line 94 which is logic high when the filtered envelope signal is greater than or equal to the threshold value and is logic low when the filtered envelope signal is less than the threshold value.

The slicer output signal is sequentially input to a series of delay elements 96(*a*)–96(*g*). Each delay element 96(*a*)–96(*g*) functions to delay the slicer output signal by 0.5 usec. The slicer output signal from the slicer 92 and from each of the delay elements 96(*a*)–96(*g*) is input to a logic circuit 98 through tap lines 100(*a*)–100(*h*).

It should be appreciated that because each delay element 96(*a*)–96(*g*) represents a 0.5 usec delay in the slicer output signal, in the event that the slicer output signal remains logic high for a duration of 3 usec, the output of six sequential delay elements, as input to logic circuit by tap lines 100(*a*)–100(*h*) will be logic high.

The slicer output signal on line 94 is also coupled to a time out circuit 102. The time out circuit 102 provides a time out signal on line 63 indicating that no carrier has been detected for a period in excess of 3.5 usec after the slicer output signal transitions from logic high to logic low.

The logic circuit 98 operates to generate a gain select signal on line 61 which represents PPM RxGain and QAM RxGain in accordance with gain select state machine 103 as shown in FIG. 5.

Referring to the state machine diagram of FIG. 5, 104 represents the state wherein the gain select signal represents QAM RxGain and state 106 represents the state wherein and gain select signal represents PPM RxGain.

When the logic circuit 98 is in state 104, it will remain in state 104 via loop 12 so long as the detected pulse width is not less than 3 usec. (e.g. either no pulse detected for the 3 usec or a continuous pulse detected on the tap lines 100(*a*)–100(*h*)) or compatibility mode is indicated by the receiver on line 60. Correspondingly, a detected pulse width less than 3 usec and the lack of compatibility mode indicated on line 60 will transition the state machine 103 to state 106 via transition 114.

The state machine 103 will remain in state 106 via loop 108 so long as PPM mode is indicated on line 60 from the reciever. Correspondingly, if PPM mode is not indicated on line 60 from the receiver, the state machine will transition back to state 104 via transition 110.

Referring to FIG. 6, a timing diagram showing exemplary operation of the CRS state machine is shown. Carrier signal 116 comprises a PPM frame 118, a QAM frame 120, and a compatibility mode frame 122 which consists of a PPM header followed by QAM data. As discussed with reference to FIG. 5, the Gain select signal 124 will remain in the QAM RxGain state so long as pulses of less than 3 usec are not detected and compatibility mode is not indicated. Transition 126 near the beginning of PPM frame 118 indicates a transition to PPM RxGain upon the detection of pulses of less than 3 usec duration. Similarly, transition 130, near the beginning of the compatibility mode frame 122, represents a transition to PPM Rx gain upon the detection of pulses less than 3 usec in duration. However, transition 132 represents the immediate transition back to QAM gain upon compatibility mode being indicated by the receiver. It should be appreciated that in the event that the receiver can detect and indicate compatibility mode before transition 130, transition 130 will not occur.

Upon completion of PPM frame 118, transition 128 to QAM RxGain occurs simultaneously with transition 110 (FIG. 5).

Referring to FIG. 7, a block diagram representing the QAM AGC circuitry 48 is shown. Envelope signal 46 is input to a logarithmic look up table 62 which generates a log signal representing 20Log of the envelope signal 46. The log signal is then compared to a predetermined reference level 64 by comparator 68 and the difference between the reference level 64 and the log signal is multipled by a loop gain constant 67 in multiplier 70 to generate a product signal. The product signal is then input to an integrator 72 which in turn generates the QAM RxGain signal. The integrator 72 will typically comprises a delay element 74, a feedback circuit 76, and an adder 78 as is known to those skilled in the art.

The loop gain constant 67 is a value generated by a loop gain constant circuit 66 which functions as a state machine in accordance with the following state machine rules:
Select K1 for the first 0.5 usec of the frame (QAM carrier indicated on line 60)
Select K2 from 0.5 usec to 1.5 usec
Select 0 (e.g. lock gain) after 1.5 usec until end of frame (Time out signal on line 63).

Referring to FIG. 8, a block diagram representing the PPM AGC circuit 50 is shown. Envelope signal 46 is input to a bank of four comparators 82(a)–82(d) each of which compares envelope signal 46 to one of four reference levels RL(1)–(4) respectively. A microcontroller 80 receives a value from each comparator 82(a)–82(c) and generates each reference level signal RL(1)–RL(4) and the PPM RxGain signal therefrom.

Referring to FIG. 9 in conjunction with FIG. 8 a flow chart showing operation of microcontroller 80 is shown. At step 84, microcontroller 80 sets PPM RxGain to the maximum gain and sets each reference level RL(1)–RL(4) to a predetermined reference level. In the preferred embodiment, RxGain is a 3 bit signal thereby representing eight possible discrete gain settings with the maximum setting represented by binary 111. At step 86, the microcontroller 80 determines whether there is saturation, or more particularly whether the envelope signal 45 is consistently above one of the four reference levels RL(1)–RL(4). If saturation is detected, the gain is adjusted at step 88. Gain adjustment is accomplished in an iterative process from the most significant bit to the least significant bit so as to rapidly converge onto the correct gain setting. One iteration occurs at each PPM pulse detected on the carrier by microcontroller 80. Therefore, at step 88, the gain will be adjusted to binary 011. After the gain is adjusted at step 88, at step 90, a counter is compared to the maximum number of iterations that could be require to select the optimum gain and, if less, the counter is incremented at step 92 and the microcontroller stops gain adjustment and as such locks the gain. If at step 86, no saturation is detected, the microcontroller proceeds directly from step 86 to step 90.

It should be appreciated that the above described device and methods provide for a simplified system for selecting an input amplifier gain setting for a receiver operating in a network environment wherein the receiver must distinguish between and receive data utilizing multiple modulation techniques.

Although the invention has been shown and described with respect to certain preferred embodiments, it is obvious that equivalents and modifications will occur to others skilled in the art upon the reading and understanding of the specification. For example, while the exemplary embodiment is directed towards PPM and QAM modulation, frequency modulation, phase shift keying, and other modulation techniques are readily substituted. Further, while the exemplary embodiment utilizes and envelope detector for distinguishing between the modulation techniques, other distinguishing techniques are readily used based on the distinguishing characteristics of a carrier signal modulated utilizing selected modulation techniques. The present invention includes all such equivalents and modifications, and is limited only by the scope of the following claims.

What is claimed is:

1. A network receiver configured for receiving a modulated carrier signal from another network transceiver via a network medium, the network receiver comprising:
   a) an input amplifier for amplifying a received modulated carrier signal according to one of a plurality of amplifier gain settings and outputting an amplified carrier signal;
   b) an envelope detector configured for outputting an envelope signal in response to the amplified carrier signal;
   c) a first gain control circuit configured to select a first gain setting in response to the envelope signal, the first gain setting being optimal for receiving a pulse position modulated carrier signal;
   d) a second gain control circuit configured to select a second gain control setting in response to the envelope signal, the second gain setting being optimal for receiving a quadrature amplitude modulated signal; and
   e) selection circuitry configured to determine whether the envelope signal represents a pulse position modulated carrier or an amplitude modulated carrier and sets the amplifier gain setting to the first gain setting or a second gain setting respectively.

2. The network receiver of claim 1, further including an analog to digital converter generating a digital carrier signal in response to the amplified carrier signal, the envelope detector responsive to the digital carrier signal.

3. The network receiver of claim 2, further including a Hilbert transformer generating a digital I channel carrier signal and a digital Q channel carrier signal in response to the amplified carrier signal, the envelope detector responsive to the digital I channel carrier signal and the digital Q channel carrier signal.

4. The network receiver of claim 3, wherein the selection circuitry includes a carrier sense circuit for detecting the duration of a power pulse in the envelope signal.

5. The network receiver of claim 4, wherein the selection circuitry selects the first gain setting if the duration of a power pulse is less than a duration on the order of a duration of a pulse position modulation power pulse.

6. The network receiver of claim 5, wherein the selection circuitry selects the second gain setting if the duration of a power pulse is greater than a duration on the order of a duration of a pulse position modulation power pulse.

7. The network receiver of claim 6, wherein the envelope signal represents the square root of the sum of the square of the I channel carrier signal and the square of the Q channel carrier signal.

8. The network receiver of claim 7, wherein the first gain control circuit includes a plurality of comparators, each configured to compare the envelope signal with one of a plurality of reference signals and the first gain setting is determined by detecting saturation of at least one comparator when iteratively testing each of the plurality of gain settings.

9. The network receiver of claim 8, wherein the second gain control circuit includes a logarithmic look up table generating a log signal representing the envelope signal, a comparator comparing the log signal to a reference signal to generate a difference signal, a multiplier multiplying the difference signal by a loop gain constant to generate a product, and an integrator integrating the product to generate the second gain setting.

10. The network receiver of claim 9, wherein the loop gain constant is selected to be a large value for a first portion of a detected power pulse, a smaller value for a second portion of a detected power pulse, and zero for a remaining duration of a detected power pulse.

11. A method of determining a gain setting for an input amplifier generating an amplified carrier signal in a receiver configured for receiving a modulated carrier signal from a network medium, the method comprising:
   a) generating an envelope signal from the amplified carrier signal representing the amplified carrier signal power;
   b) determining a first gain setting in response to the envelope signal, the first gain setting selected for receiving a pulse position modulated carrier signal;
   c) determining a second gain setting in response to the envelope signal, the second gain setting selected for receiving a quadrature amplitude modulated carrier signal;
   d) determining whether the modulated carrier signal is a pulse position modulated carrier or a quadrature amplitude modulated carrier; and
   e) setting the gain of the input amplifier to the first gain setting if the modulated carrier signal is determined to be a pulse position modulated carrier and setting the input amplifier gain to the second gain setting if the modulated carrier signal is determined to be a quadrature amplitude modulated carrier.

12. The method of claim 11, further comprising converting the amplified carrier signal to a digital carrier signal, the envelope signal being generated from the digital carrier signal.

13. The method of claim 12, further comprising generating an I channel signal and a Q channel signal from the digital carrier signal, the envelope signal being generated from the I channel signal and the Q channel signal.

14. The method of claim 13, wherein the step of setting the gain of the input amplifier includes detecting the duration of a power pulse in the envelope signal.

15. The method of claim 14, wherein the gain of the input amplifier is set to the first gain setting if the duration of a power pulse is less than a duration on the order of a duration of a pulse position modulation power pulse.

16. The method of claim 15, wherein the gain of the input amplifier is set to the second gain setting if the duration of a power pulse is greater than a duration on the order of a duration of a pulse position modulation power pulse.

17. The method of claim 16, wherein the envelope signal represents the square root of the sum of the square of the I channel signal and the square of the Q channel signal.

18. The method of claim 17, wherein the first gain setting is determined by comparing the envelope signal to a plurality of reference levels and iteratively testing each of the plurality of gain settings for saturation occurring at least one reference level to determine the first gain setting.

19. The method of claim 18, wherein the second gain setting is determined by converting the envelope signal to a log signal representing the envelope signal, comparing the log signal to a reference level to determine a difference, multiplying the difference by a loop gain constant to determine a product, and integrating the product to determined the second gain setting.

20. The method of claim 19, wherein the loop gain constant is selected to be a large value for a first portion of a detected power pulse, a smaller value for a second portion of a detected power pulse, and zero for a remaining duration of a detected power pulse.

21. A network receiver configured for receiving a modulated carrier signal from another network transceiver via a network medium, the network receiver comprising:
   a) an input amplifier for amplifying a received modulated carrier signal according to one of a plurality of amplifier gain settings and outputting an amplified carrier signal;
   b) a first gain control circuit for providing a first amplifier gain setting based on a carrier signal modulated in accordance with a first modulation method;
   c) a second gain control circuit for providing a second amplifier gain setting based on a carrier signal modulated in accordance with a second modulation method;
   d) a selection circuit for analyzing the carrier signal and automatically identifying whether the carrier signal is modulated in accordance with the first modulation method or the second modulation method, and for providing a gain control signal to the input amplifier to amplify the carrier signal with either the first amplifier gain setting or the second amplifier gain setting based on the modulation method identified by the selection circuit, wherein the selection circuit includes envelope detection circuitry for detecting the duration of a power pulse in the envelope signal, and wherein the selection circuit provides a gain control signal coupling the first amplifier gain setting to the input amplifier if the duration of a power pulse is less than a duration on the order of a duration of a pulse position modulation power pulse.

22. The network receiver of claim 21, wherein the selection circuit provides a gain control signal coupling the second amplifier gain setting to the input amplifier if the duration of a power pulse is greater than a duration on the order of a duration of a pulse position modulation power pulse.

* * * * *